United States Patent
Nagaralu et al.

(10) Patent No.: US 7,805,469 B1
(45) Date of Patent: Sep. 28, 2010

(54) METHOD AND APPARATUS FOR SPLITTING AND MERGING FILE SYSTEMS

(75) Inventors: Sree Hari Nagaralu, Pune (IN); Sunder Phani Kumar, Pune (IN); Naga Kishore Kommuri, Maharastra (IN)

(73) Assignee: Symantec Operating Corporation, Mountain View, CA (US)

( * ) Notice: Subject to any disclaimer, the term of this patent is extended or adjusted under 35 U.S.C. 154(b) by 445 days.

(21) Appl. No.: 11/023,734

(22) Filed: Dec. 28, 2004

(51) Int. Cl.
*G06F 12/00* (2006.01)
*G06F 17/30* (2006.01)

(52) U.S. Cl. ...................... 707/822; 707/829
(58) Field of Classification Search ............... 707/101, 707/200

See application file for complete search history.

(56) References Cited

U.S. PATENT DOCUMENTS

| | | | |
|---|---|---|---|
| 5,689,706 A * | 11/1997 | Rao et al. | 707/201 |
| 7,043,503 B2 * | 5/2006 | Haskin et al. | 707/200 |
| 7,080,051 B1 * | 7/2006 | Crawford | 705/400 |
| 7,146,377 B2 * | 12/2006 | Nowicki et al. | 707/102 |
| 7,165,096 B2 * | 1/2007 | Soltis | 709/217 |
| 7,206,795 B2 * | 4/2007 | Bono | 707/203 |
| 2003/0009484 A1 * | 1/2003 | Hamanaka et al. | 707/200 |
| 2003/0158873 A1 * | 8/2003 | Sawdon et al. | 707/204 |
| 2003/0182326 A1 * | 9/2003 | Patterson | 707/204 |
| 2004/0030731 A1 * | 2/2004 | Iftode et al. | 707/205 |
| 2004/0098363 A1 * | 5/2004 | Anglin et al. | 707/1 |
| 2005/0091333 A1 * | 4/2005 | Kobayashi et al. | 709/212 |
| 2005/0114291 A1 * | 5/2005 | Becker-Szendy et al. | 707/1 |
| 2005/0204108 A1 * | 9/2005 | Ofek et al. | 711/162 |
| 2007/0156772 A1 * | 7/2007 | Lechner | 707/200 |
| 2008/0040483 A1 * | 2/2008 | Nakatani et al. | 709/226 |

* cited by examiner

*Primary Examiner*—Cam Y T Truong
(74) *Attorney, Agent, or Firm*—Campbell Stephenson, LLP

(57) ABSTRACT

Methods and computer program products that provide for extracting a portion of a file system for use as an independent file system and merging a file system into another file system are presented. One or more storage objects containing data from a multi-volume file system can be extracted from the multi-volume file system. One or more storage objects containing a first file system can be merged with one or more other storage objects containing a second file system, thus forming a merged file system.

7 Claims, 7 Drawing Sheets

METHOD AND APPARATUS FOR SPLITTING AND MERGING FILE SYSTEMS

FIELD OF THE INVENTION

The field of this invention relates generally to computer file systems. More particularly, the field of the invention relates to methods for splitting a portion of a file system for use as an independent file system and for merging a file system into another file system.

BACKGROUND OF THE INVENTION

The ability to store, process and transmit information is a facet of operations that businesses rely upon to conduct their day-to-day activities. For businesses that increasingly depend upon data and information for their operations, an inability to store data, an inability to process data, or an inability to transmit data can hurt a businesses' reputation and bottom line. Businesses are taking measure to improve their ability to store, process, and transmit data, and to more efficiently share resources that enable these operations, while minimizing the cost thereof.

To assist businesses in realizing these goals, the storage industry has produced a rich set of data storage options for storing online digital data, each with its own performance, availability, and cost characteristics. Businesses can keep capital costs of data storage low by choosing, for example, disk drives attached directly to server I/O buses, or they can opt for more elaborate and expensive disk arrays that provide packaging, power and cooling, and centralized management for dozens, or even hundreds of disk drives. Further, businesses can use RAID technology or storage virtualization to improve performance and/or reliability.

Storage virtualization technology (e.g., volume managers) partition, concatenate, stripe, mirror, etc., several physical disk drives, and present a resulting logical volume as though it were a single disk drive. A resulting logical volume will often have better performance and/or reliability characteristics when compared to individual underlying physical disk drives. Storage virtualization technology such as RAID also enhances performance characteristics of underlying physical disk drives. Storage virtualization technology can also aggregate logical volumes to create a higher level logical volume. A "storage object" can be any device, physical or logical, used to store data, including a physical disk drive, a logical volume, or an aggregate of logical volumes.

Storage virtualization technology can be implemented in several ways. For example, virtualization technology can be implemented in disk arrays, using microprocessors programmed specifically for the task. Another implementation of virtualization technology is in application servers, using volume management software. A further example of implementation of virtualization technology is in a storage network, using switch-resident virtualization software.

Classes of storage can be considered as a combination of hardware technology options (e.g., a collection of disk drives, a low end array of disks, or an enterprise array of disks), storage virtualization technology, and storage virtualization implementation techniques. Each combination has unique advantages and limitations. Storage options may be designed for fast access, high availability, rapid disaster recovery, low impact on resources during data backup, low cost or other factors.

An area of concern to businesses is efficient and cost effective management of data storage resources. Historically, storage resources such as disk drives have been physically located where computing resources have been located. When the bulk of computing resources for a business were centralized in a mainframe computing environment, the bulk of the data storage resources were centrally located in proximity to the mainframe. However, as businesses adopted a distributed computing model, data storage resources also tended to be distributed throughout the network.

Such a distribution of data storage resources creates several problems for information technology (IT) management. IT managers must maintain and support data storage resources physically located over a wide geographic area, thus causing costly expenditures in personnel and time to conduct such maintenance. Distribution of data resources among individual workgroups can also be inefficient and costly.

To avoid this problem, businesses have adopted storage virtualization methods that can present all network storage as a pool of storage. Such virtualization has been made possible, in part, by separating physical data storage resources from the computing resources, using network attached storage (NAS) or storage area networks (SAN) mechanisms. Once physical data storage resources are physically separate from computing resources (e.g., application severs and database servers), the physical data storage resources can be centrally located as a pool in one or in a few locations that are under direct IT management. Such centralization allows for more efficient support and maintenance of the physical data storage resources.

The shift in storage paradigm from directly-attached, physical disks to centrally-located, virtualized volumes provided over a network has also allowed for a shift in how file systems are maintained on the storage resources. In an environment in which a disk drive is directly attached to computing resources, a file system is formatted onto all or part of the physical disk drive. Typically, a file system is bounded by the storage memory space limits of the physical disk drive.

As discussed above, storage virtualization tools can partition, concatenate, stripe and/or mirror several physical disk drives, and present a resulting storage volume as a virtual volume. A virtualized volume is seen by an application server or database server as a single "device." The application server or database server does not see the individual physical disk drives that comprise the virtualized volume. An application server creates a file system on a virtualized volume in the same manner that a file system would be created on an individual physical disk drive. The file system and its data are spread across all physical disks comprising the virtualized volume in a manner consistent with the virtualization technique being employed for that volume. From the file system's point of view, a virtual volume functions as a disk drive with a couple of extra features (e.g., online capacity expansion); thus, the file system treats all storage objects equally.

Additional flexibility in allocating storage can be provided by a file system that spans multiple volumes. In a multi-volume file system, each volume mounted by the file system can have its own properties (e.g., mirrored storage or RAID), thus allowing for data to be placed in an optimal storage type dependent upon the classification of data.

Volumes mounted by a multi-volume file system must be logically associated with each other so that operations and state changes that affect the file system (e.g., failure of a volume) are dealt with atomically. In one embodiment (provided by VERITAS' Storage Foundation Volume Manager), a "volume set" logical construct associates a multi-volume file system's volumes with one another. Such a volume set construct partially subsumes the volume's identities (e.g., a multi-volume file system is formatted on the volume set rather than on its individual member volumes), and partially leaves their identities intact (e.g., the file allocation and relocation policies that can direct files to individual volumes). In a multi-volume file system, files can be distributed randomly across the volumes or can have specified locations as set by rule. This intimate association of member volumes of a multi-volume file system results in a lack of flexibility when one desires to remove a volume from the multi-volume file system. Traditionally, in order to effect a removal of a volume from a multi-volume file system, the volume must be empty of all data before removing it from the file system.

On occasion, it can be desirable to extract a portion of a file system for subsequent use by another computer or set of computers or to be merged with another file system on another computer or set of computers or mounted independently on another computer system. Cross-platform data sharing works only at the level of a complete file system. Sometimes, only part of a file system needs to be exported to another machine. In such a case, there are no solutions for exporting a specific part of a file system (e.g., a directory) onto another machine, unless the entire file system is being copied. Copying a file system, or a directory structure within a file system, consumes processor resources, I/O capacity, and can also result in data unavailability while files and directories are being copied from one device to another.

It is desirable to have support for dismounting and mounting file systems or portions thereof on demand. It is also desirable to continue to have access to data being extracted from the file system with minimal unavailability of the data and with minimal impact upon processing. Further, it is desirable to be able to merge a local file system into a global file system and extract a part of a global file system as a local file system in an environment where multiple disk volumes can be shared by multiple computer resources in a wide geographic area. In a multi-device, multi-volume file system, it can be desirable to build a file system on devices including removable media, which can then be extracted from the multi-volume file system and still be useable independent from the multi-volume file system.

SUMMARY OF THE INVENTION

The present invention presents a method that provides for extracting a portion of a file system for use as an independent file system and merging a file system into another file system.

Accordingly, one embodiment of the present invention provides a method and computer program product for extracting a portion of a file system from a multi-volume file system. A first storage object that is a member of the multi-volume file system and which stores a portion of the file system is selected for extraction. One or more files from the file system are selected for extraction and are moved to the first storage object. Once the first storage object has all the files selected for extraction, the first storage object is extracted from the file system.

In one aspect of the above embodiment, moving a selected file involves storing an Mode corresponding to the file on the first storage object and storing data referenced by the mode on the first storage object. In a further aspect of the above embodiment, moving the file involves setting a placement policy for the file that determines the storage object in a multi-volume file system on which to store the file's data. In another aspect of the above embodiment, a file that is not to be extracted with the selected storage object is moved off of the selected storage object and onto a second storage object that is not being extracted. In a further aspect of the above embodiment, file system metadata is generated and stored on the first storage object so that the first storage object can function as a separate file system.

Another embodiment of the present invention provides a method and computer program for merging a first file system with a second file system, forming a multi-volume file system. A first storage object is included in a set of storage objects. The first storage object stores a first file system and the set of storage objects stores a second file system. The metadata from the first file system is integrated with metadata from the second file system.

In one aspect of this embodiment, the metadata from the first file system comprises a listing of inode identifiers corresponding to each file in the first file system, wherein an inode identifier comprises an inode number and an inode list identifier. An inode list identifier can uniquely identify an inode list associated with an inode. In a further aspect of this embodiment, a directory file in the second file system is selected to be linked with the first file system, and the root node of the first file system is associated with the selected directory file.

The foregoing is a summary and thus contains, by necessity, simplifications, generalizations and omission of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
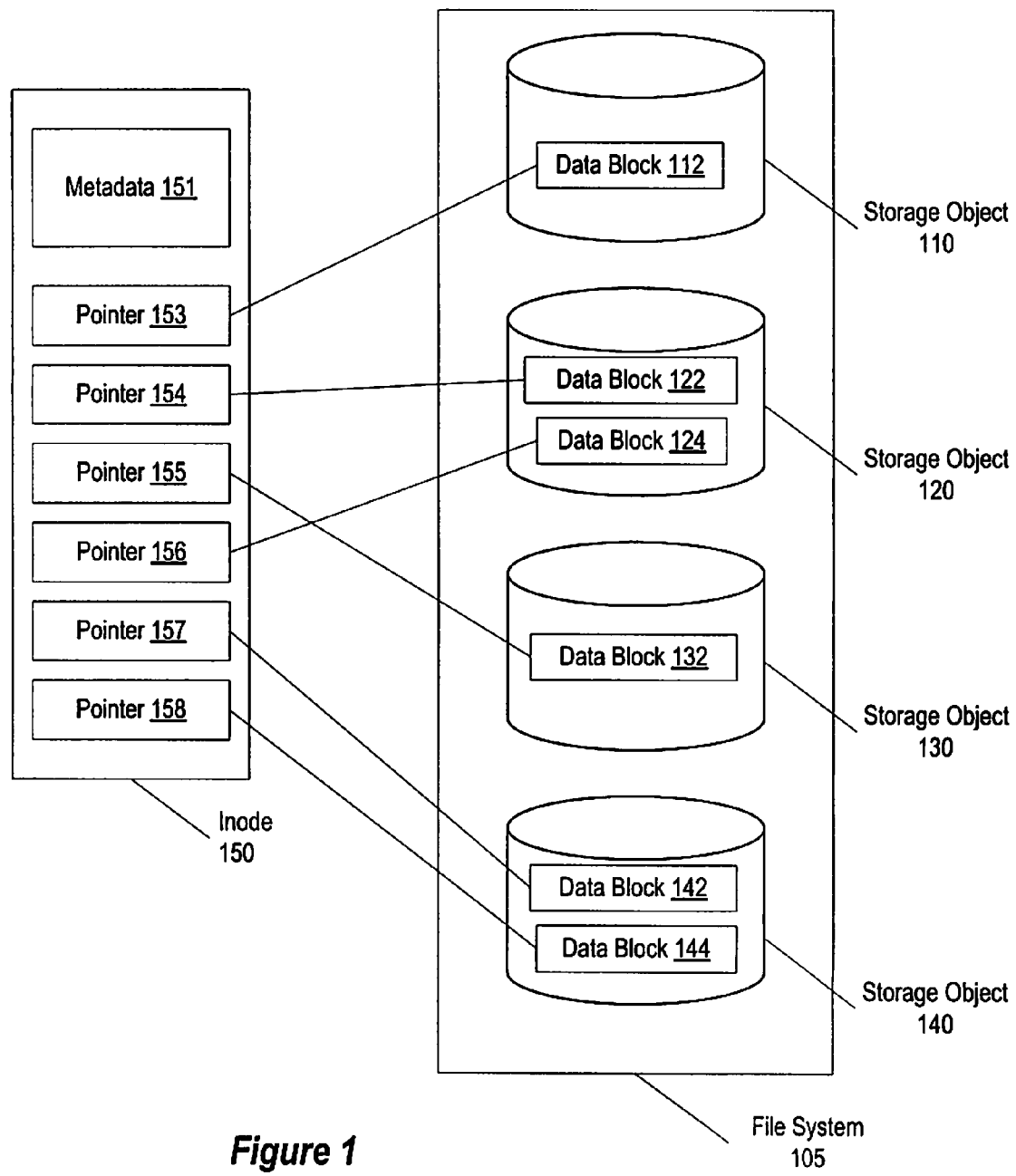
FIG. 1 is a block diagram illustrating a distribution of file data in a multi-volume file system.

The present invention provides a means for rendering a portion of a file system portable between network nodes or other file systems. One embodiment of the present invention allows for extracting a member storage object from a multi-volume file system so that an application server mounting the extracted storage object can access files resident on the extracted storage object. One aspect of this embodiment includes selecting files to be extracted along with the storage object, modifying Modes of the files in order to move the desired files to the storage object to be extracted. Other aspect may include selecting those files not desired to be extracted from the selected storage object, and generating file system metadata on the storage object. Another embodiment of the invention includes importing a storage object comprising a file system into a multi-volume file system. One aspect of this embodiment includes utilization of a two-dimensional Mode list in order to maintain unique identities of modes on the storage object being imported with respect to Modes already present on the multi-volume file system.

File System Structure

A file system is a data structure or a collection of files. In the Unix operating system, for example, "file system" can refer to two distinct things: the directory tree or the arrangement of files on disk partitions. The latter has a tangible physical location and can be thought of as a physical file system, while the former is a logical structure and can be thought of as a logical file system. A physical file system is mounted on a portion of a storage object called a partition. Partition size determines the amount of storage object memory space that the file system can use. Storage object memory space is typically divided into a set of uniformly sized blocks that are allocated to store information in the file system. File systems typically have a superblock, Modes and data blocks.

A superblock stores information about the file system. Such information can include size and status of the file system, a label (file system name and storage object name), size of the file system logical block, date and time of the last update to the file system, summary data block, file system state, and a path name of a last mount point of the file system. A superblock can also include references to the location of additional file system structural files. A superblock contains critical data related to the file system without which the file system could not be accessed, and therefore often multiple, redundant superblocks are made when a file system is created. The summary data block within the superblock can record changes that take place as the file system is used and can include the number of inodes, directories, fragments, and storage blocks within the file system.

Information about each file in a file system can be kept in a structure called an inode. An Mode contains pointers to disk blocks of one or more storage objects containing data associated with a file, as well as other information such as the type of file, file permission bits, owner information, file size, file modification time, etc. This additional information is often referred to as metadata. Pointers in an Mode point to data blocks or extents on the storage object in file system memory space.

Data blocks or extents contain the rest of the space that is allocated to a file system. The size of a data block is determined when a file system is created. For a regular file, data blocks contain the contents of the file. For a directory, the data blocks contain entries that give Mode number and file name of files in the directory. Blocks that are not currently being used as Modes, indirect address blocks, or as data blocks can be marked as free in the superblock. Further, a list of Modes in the file system is also maintained, either in the superblock or referenced by the superblock.

A file system structure substantially such as that described above can be found in, for example, Unix operating systems or the VERITAS File System. It should be understood that the present invention is not limited to use with Modes or operating systems using Modes, and may be used in association with any file system that uses a file data structure in association with data stored on a storage object, however, in the ensuing discussion, Mode terminology is used as a point of reference.

Extracting a Storage Object Containing a File System from a Multi-Volume File System FIG. 1 illustrates the distribution of a file's data in a multi-volume file system. Multi-volume file system 105 comprises storage objects 110, 120, 130, and 140. As discussed above, storage objects 110-140 can each be a single physical disk, multiple physical disks virtualized as a single volume, or two or more underlying volumes, each one of which is a logical aggregation of one or more physical disks. While illustrated item 105 is described as a multi-volume file system, such terminology is not meant to limit the file system to a plurality of volumes, but rather is used to refer generally to a file system on a plurality of storage objects. An inode 150 associated with a file stored in the multi-volume file system comprises metadata 151 and pointers 153, 154, 155, 156, 157, and 158. Data blocks (112, 122, 124, 132, 142, and 144) containing data associated with the file are spread among the four storage objects of multi-volume file system 105, and are shown linked to their corresponding pointer (e.g., pointer 153 is linked to data block 112 in volume 110). In addition, inode 150 can be stored in file system memory space on any one of the four storage objects in the multi-volume file system. Alternatively, file system 105 can include an additional storage object that contains only file system metadata and inodes; such a configuration can optimize file access due to differences in accessing metadata and data.

Similarly, a directory in multi-volume file system 105 can have its inode on any of the storage objects in the multi-volume file system, and the inodes representing each file within that directory can be in any of the storage objects in the multi-volume file system as well. Without a specific rule governing the placement of files in a directory applied to the multi-volume file system, files and their inodes will be distributed among the storage objects in the multi-volume file system.

In order to extract one or more selected storage objects from a multi-volume file system that also includes desired directories/files, both inodes and data for directories and files desired to be extracted with the selected storage objects must be moved to the selected storage objects. Further, inodes and data for directories and files that are not desired to be extracted and which are resident on the selected storage objects, must be moved to storage objects that will continue as members of the multi-volume file system. For example, if the file associated with inode 150 is to be extracted with storage object 140, then inode 150 is moved to storage object 140, along with data blocks 112, 122, 124, and 132. As another example, if storage object 140 is to be extracted, but the file represented by inode 150 is not, then data blocks 142 and 144 are moved to one or more of the other storage objects (110, 120, 130) along with inode 150, if inode 150 is initially contained in storage object 140.

Figure 2A:
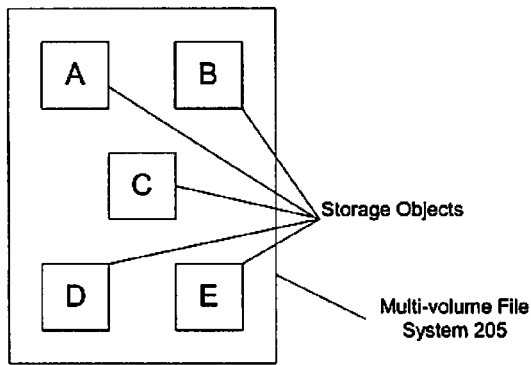
FIGS. 2A, 2B, and 2C are block diagrams illustrating the process of extracting a portion of a file system from a multi-volume file system in accord with one embodiment of the present invention.
Figure 2A:
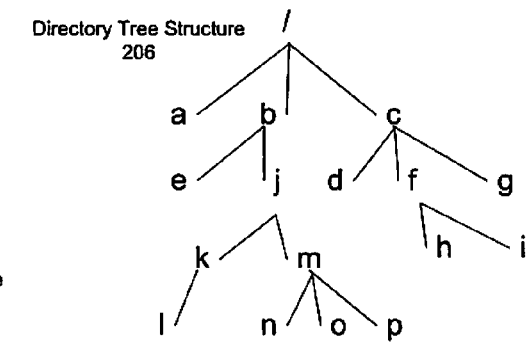
Figure 2B:
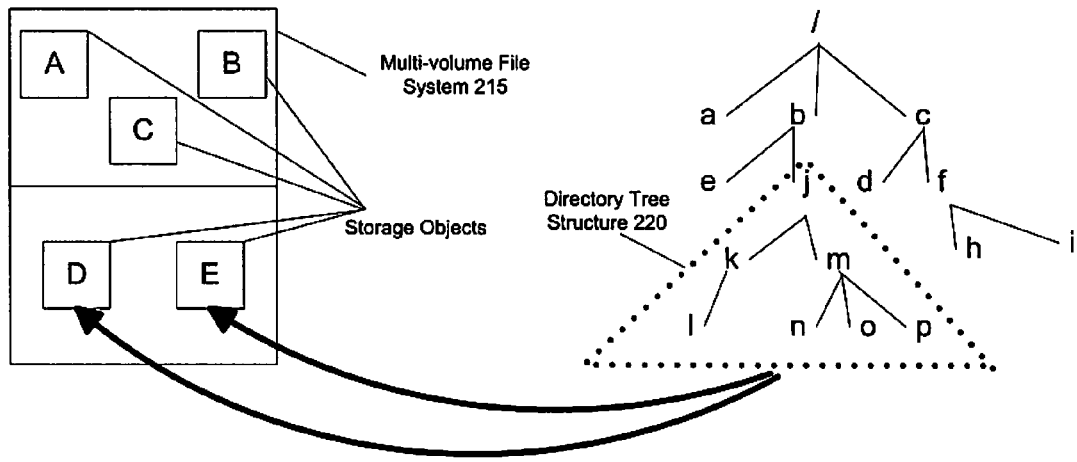
Figure 2C:
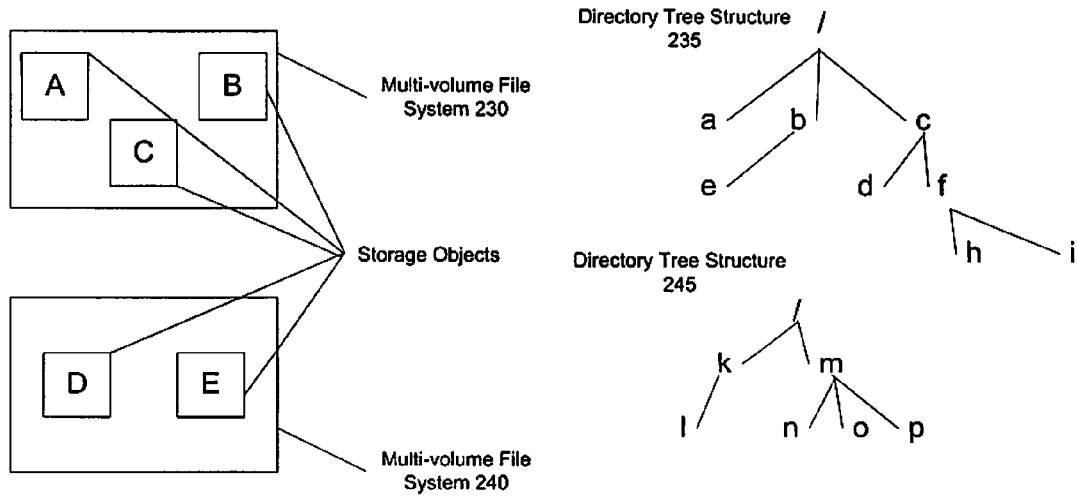

FIGS. 2A, 2B, and 2C are block diagrams further illustrating the process of extracting a portion of a file system from a multi-volume file system in accord with one embodiment of the present invention. FIG. 2A illustrates a multi-volume file system 205 comprising storage objects A, B, C, D, and E. The multi-volume file system has a directory tree structure 206. FIG. 2B shows a selection for extraction of storage objects D and E from the multi-volume file system (215) having files in directory /b/j and below (220). The directory /b/j and all subdirectories and files are reorganized, as described above and below in association with FIG. 3, so that all inodes and data associated with those directories and files are located only on volumes D and E, and the rest of the file system is reorganized so that all inodes and data associated with those directories and files are located only on volumes A, B, and C. FIG. 2C shows the result of the split of the multi-volume file system into two multi-volume file systems 230 (comprising storage objects A, B, and C) and 240 (comprising storage objects D and E).

Figure 3:
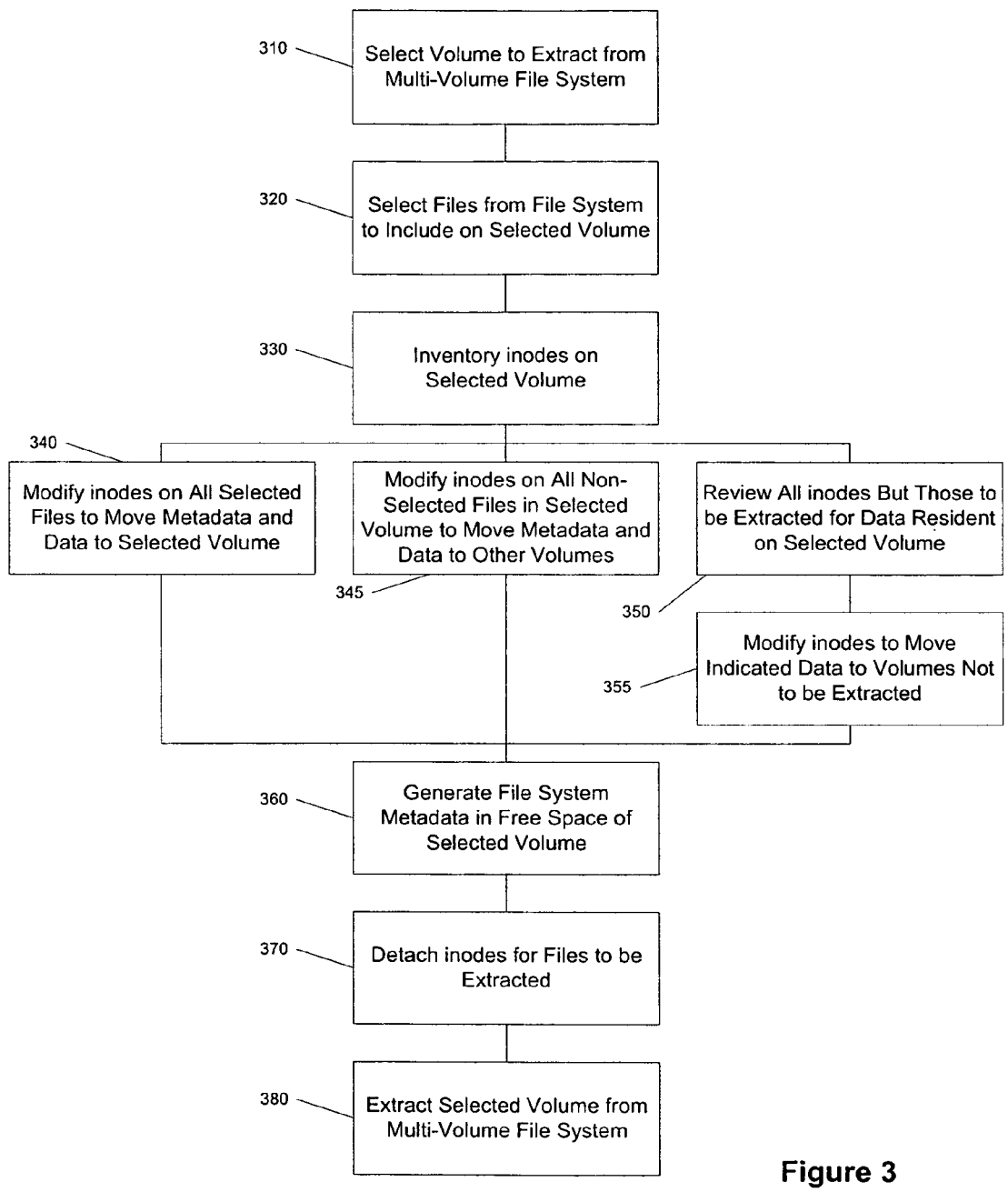
FIG. 3 is a flow diagram illustrating a process to extract a volume from a multi-volume file system in accord with one embodiment of the present invention.

FIG. 3 is a flow diagram illustrating a process to extract one or more storage objects from a multi-volume file system according to one embodiment of the present invention. One or more storage object are selected for extraction from the multi-volume file system (310). A user or application can then select files in the multi-volume file system to include on the selected storage objects (320). Such a selection process can be done on a directory-by-directory basis or on a file-by-file basis (note that in a Unix file system there is no distinction between directory files and data files). Once storage objects are selected for extraction and the files to be included for extraction are selected, an inventory process can be conducted on the multi-volume file system to determine those inodes and data that must be moved to the selected storage objects and those inodes and data that must be moved from the selected storage objects (330).

In light of the results of the selection and inventory process, inodes and data can be moved in preparation for storage object extraction. Inodes for all files selected to be extracted can be modified to move metadata and data to the selected storage objects (340). Such a modification process can include modifying a placement policy for the inode and associated data. A placement policy can specify for an inode where all data associated with the Mode is to reside in a multi-volume file system. Upon changing a placement policy, the file system can be told to immediately implement the placement policy and move the affected data and metadata. For example, in the VERITAS File System, a temporary inode is created on the target storage object and data blocks not already on the target storage object are created by duplicating the data in existing blocks. Pointers in the new Mode are generated to reflect the new data blocks, and then the directory references to the old Mode are removed from the directory structure and replaced with the references to the new inode. At this point data blocks allocated to the old inode are freed by the file system. During this process, users or applications can continue to access the data, as the process is transparent to a user or application.

Similarly, inodes for all non-selected files currently resident in the selected storage objects can be modified to move metadata and data to a storage object continuing to be a member of the multi-volume file system (345). A list of such Modes can be acquired during inventory process 330. Additionally, since data blocks associated with an inode are not necessarily stored on the same storage object as the inode, all Modes in the multi-volume file system, except those to be extracted, can be reviewed for data blocks resident on the storage objects selected for extraction (350). In response to the results of that review, any Modes having data on the selected storage objects can be modified to move the indicated data to a storage object that will not be extracted (355).

The above process of moving Modes and associated data results in having only desired inodes and data on the storage objects selected to be extracted. But the selected storage object still cannot stand on its own as a file system because a multi-volume file system contains only one set of file system structure information (i.e., the superblock, etc.). In order for the selected storage objects to perform as an independent file system, file system structural information must be generated and stored in the selected storage objects' free space (360). In preparation for extraction of the selected storage objects, inodes for all files to be extracted with the storage objects are detached from the file system (i.e. references to the inodes are removed from directories) (370). At this point, files associated with those inodes can no longer be accessed by a user or application of the multi-volume file system. The selected storage objects can then be extracted from the multi-volume file system (380).

Once extracted, the extracted storage objects can be mounted and accessed by a network node as a separate file system. Alternatively, an extracted storage object can be a removable media (e.g., an optical disk), which can then be mounted and accessed as a file system by another computer system. Further, the extracted file system can be merged with another file system if desired. Should it be necessary, the extracted storage objects can be converted from big-endian to little-endian, if necessary for use by a desired remote system.

Importing a Storage Object Containing a File System into a Multi-Volume File System Inclusion of a storage object already containing a file system into a multi-volume file system can be desirable. For example, an extracted storage object can be re-mounted in a multi-volume file system from which it was extracted, or two independent file systems residing on two sets of storage objects can be merged into one large file system residing on a single set of storage objects, or a file system storage object can be mounted in a multi-volume file system accessible to a group of network nodes for global access after local development, or a file system on a removable media storage object can be included in a multi-volume file system.

Figure 4A:
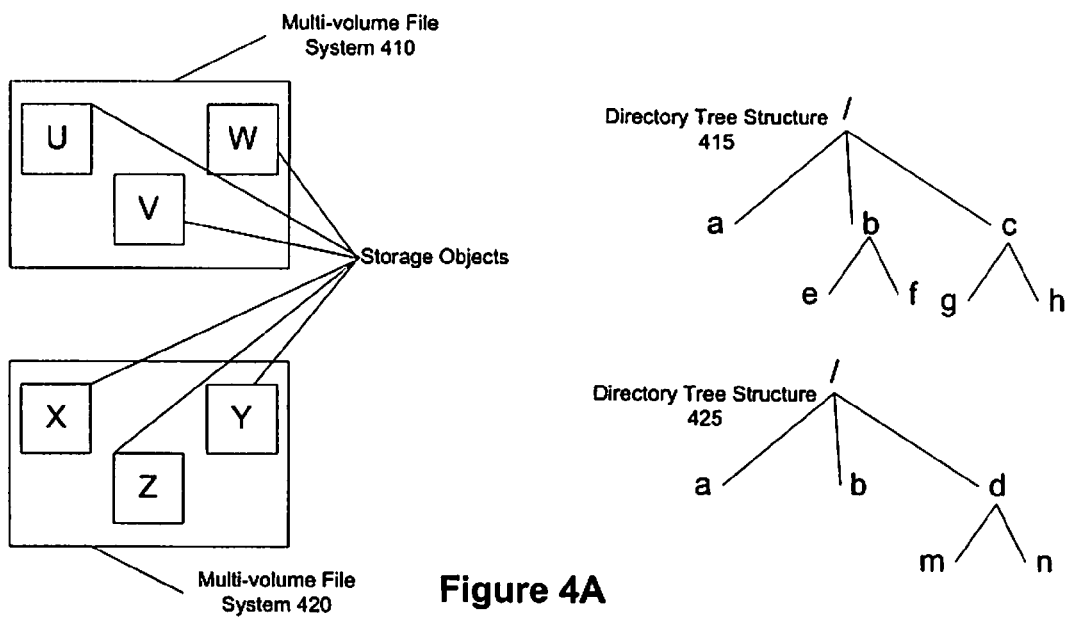
FIGS. 4A, 4B, and 4C are block diagrams illustrating the importation or incorporation of storage objects containing a file system into a multi-volume file system in accord with one embodiment of the present invention.
Figure 4B:
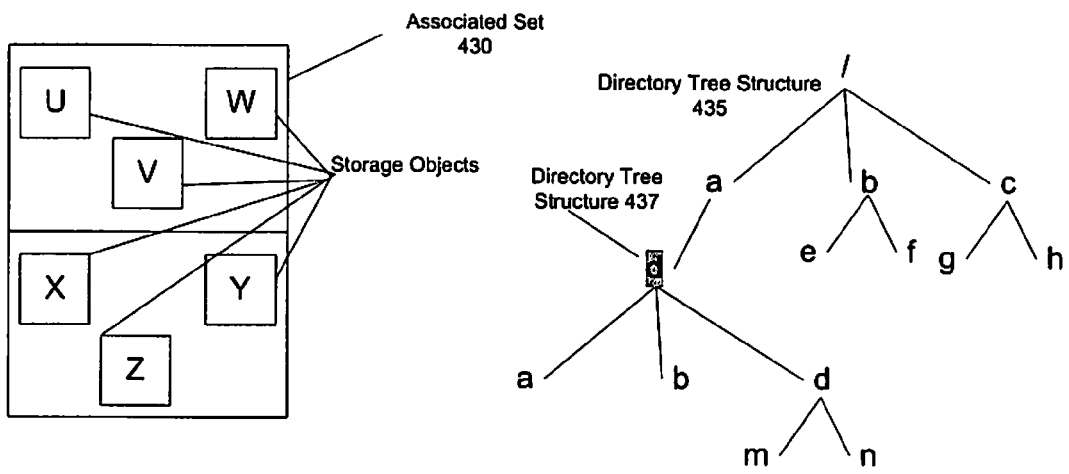
Figure 4C:
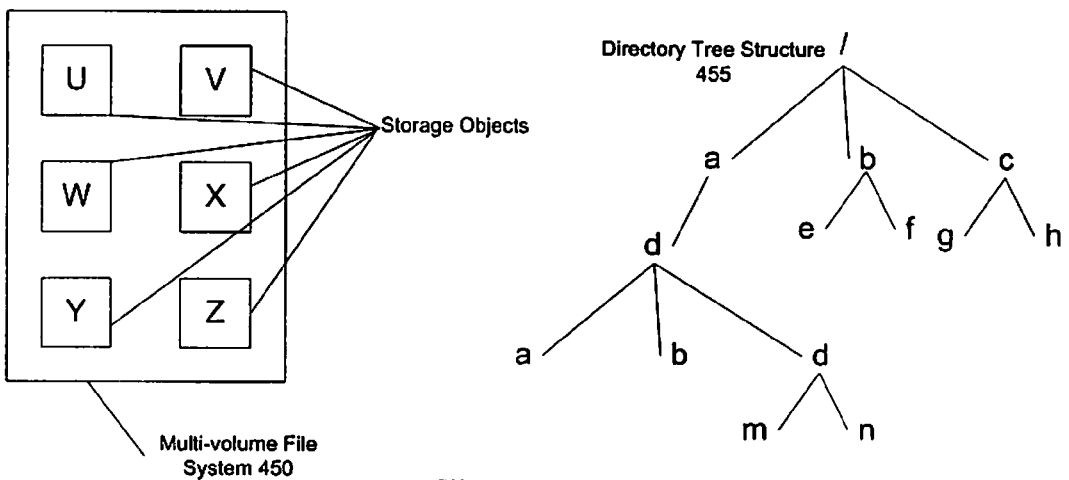

FIGS. 4A, 4B, and 4C are block diagrams illustrating the importation or incorporation of storage objects containing a file system into a multi-volume file system in accord with one embodiment of the present invention. FIG. 4A illustrates two multi-volume file systems 410 and 420 and corresponding associated directory trees 415 and 425. In FIG. 4B, a directory is created in directory tree 415 on which to attach directory tree 425. This is illustrated as /a/d (437) in directory tree 435. Multi-volume file systems 410 and 420 are now shown as an associated set of storage objects 430 (e.g., a volume set). FIG. 4C shows a result of merging the two file systems into one multi-volume file system 450 with a directory tree structure 455. Such a merger occurs after the entries for the inode list of file system 420 is incorporated into the inode list of 410, as discussed below in association with FIG. 5.

Figure 5:
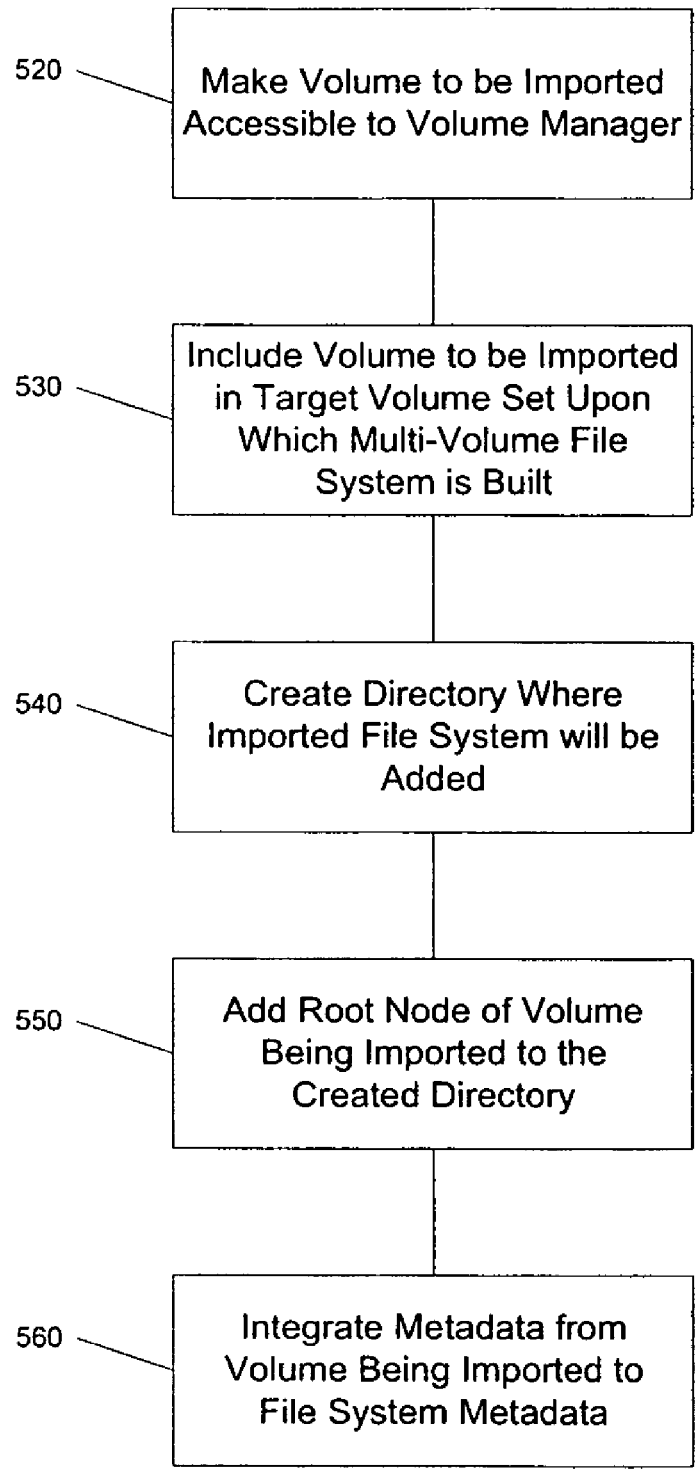
FIG. 5 is a flow diagram illustrating a process for importing a volume containing a file system into a multi-volume file system in accord with one embodiment of the present invention.

FIG. 5 is a flow diagram illustrating a process for importing one or more storage objects containing a file system in a multi-volume file system according to one embodiment of the present invention. If necessary, data in the storage objects to be imported into the multi-volume file system can be converted to a format appropriate to the target computing environment (e.g., big-endian to little-endian). The storage objects can then be made accessible to a volume manager that is managing the storage objects upon which the multi-volume file system is built (520). If there is a disk to be included in the multi-volume file system that is not already classified as a volume, the volume manager may need to perform operations necessary to classifying the disk as a volume. The volume manager can then include the volume or storage object in a volume set upon which the multi-volume file system is built (530).

Once the storage object is included in the volume set, a directory can be created in the multi-volume file system where the file system resident on the volume being included will be accessed (540). A root node for the storage object being included can be added to the created directory (550), which then links the directory to the file structure on the included storage object.

At this point, metadata on the included storage object must be integrated with the multi-volume file system metadata (560). Since file systems typically create and associate inode numbers sequentially, it is likely that inode numbers on the newly included storage object will be identical to inode numbers already existing on the multi-volume file system. Integrating these identical inode numbers can lead to file system error or failure. To avoid such a result, a means for uniquely identifying inode numbers resident on each storage object or each file system can be employed. Such an inode identification scheme can include a two-dimensional identification of inodes, wherein one dimension is an identifier for the inode list to which the inode belongs and the second dimension is the inode number itself. In this manner, each two-dimensional inode identifier is unique within a file system and concerns relating to duplication of Mode numbers are avoided.

Once the root node of the included file system along with integration of the metadata has been completed, a user or application accessing the multi-volume file system can access the data as stored on the included storage object. Further, should Modes on the newly included storage object include a placement policy wherein all data associated with those Modes resides on that storage object, then new data blocks or extents associated with those Modes will also be recorded on that storage object, thereby facilitating any future extraction of that storage object from the multi-volume file system.

It should be noted that the present invention is not limited to volumes as members of a multi-volume file system, but can include any storage object that can be associated with a group of storage objects that can be mounted as part of a file system. This can include, but is not limited to, physical disk drives, volumes, and aggregates of volumes.

An Example Computing and Network Environment

As shown above, the present invention can be implemented using a variety of computer systems and networks. An example of one such computing and network environment is described below with reference to FIGS. 6 and 7.

FIG. 4 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Figure 6:
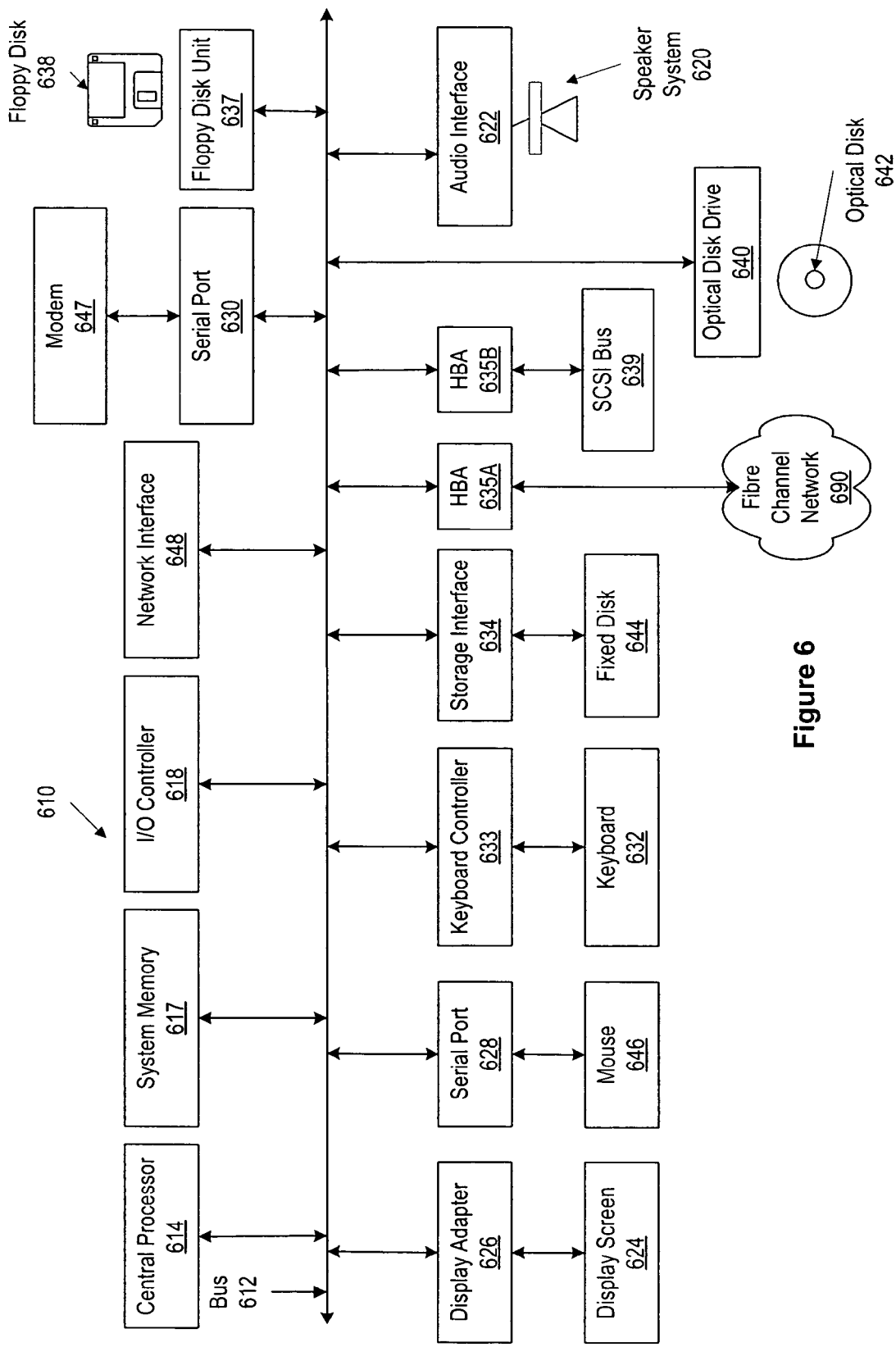
FIG. 6 is a block diagram depicting a computer system suitable for implementing the present invention.

Many other devices or subsystems (not shown) may be connected in a similar manner (e.g., bar code readers, document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. Additionally, computer system 610 can be any kind of computing device, and so includes personal data assistants (PDAs), network appliance, X-window terminal or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
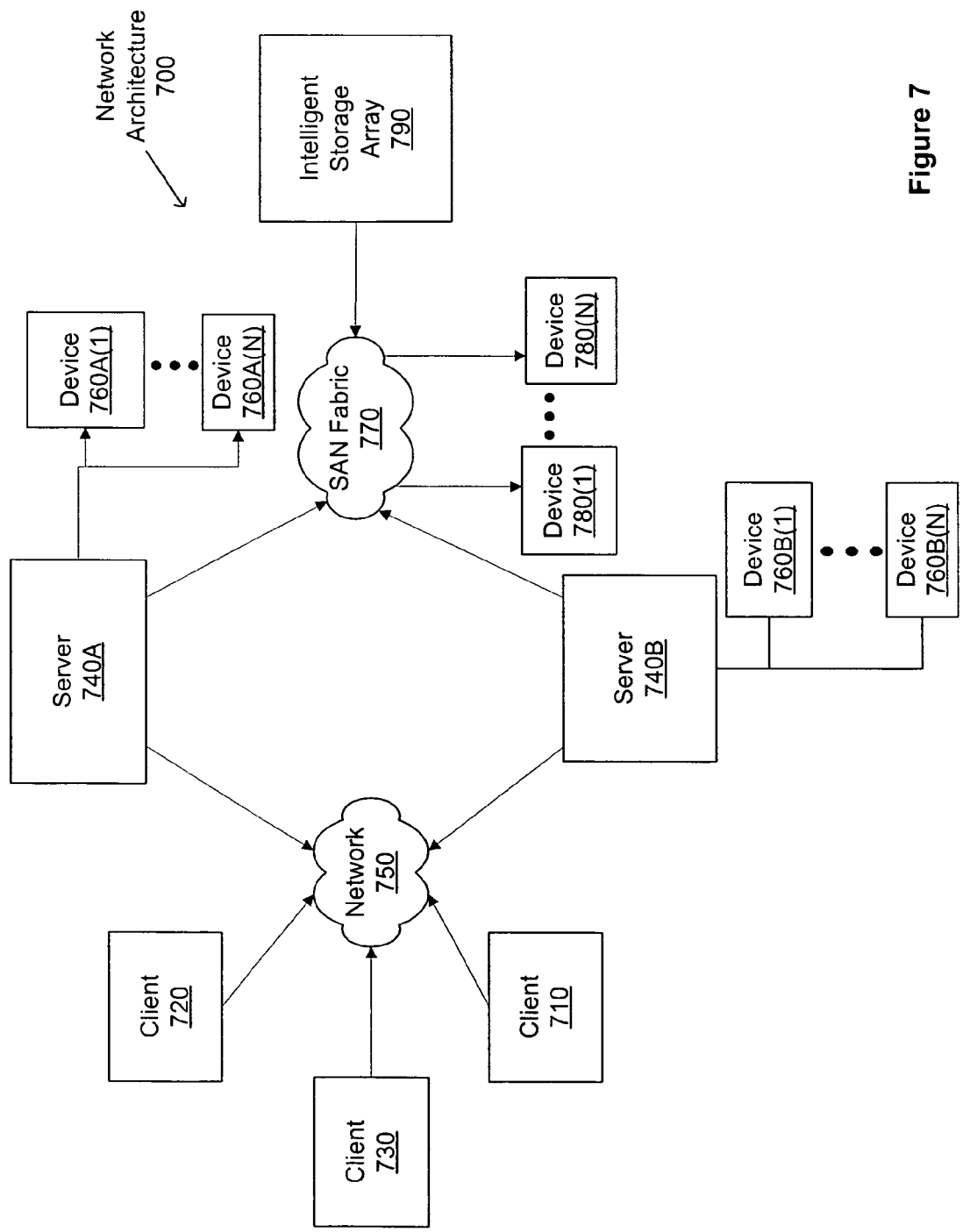
FIG. 7 is a block diagram depicting a network architecture suitable for implementing the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1) (N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method for merging file systems, the method comprising:
    including a first storage object in a set of storage objects, wherein
        each storage object in the set of storage objects is a device used to store data,
        the first storage object comprises a portion of a first file system stored in the first storage object, and
        the set of storage objects comprises
            a second storage object, and
            a second file system stored in the set of storage objects;
    integrating metadata from the first file system with metadata from the second file system, such that the first and second file systems are merged into a single file system, wherein
        the metadata from the first file system comprises a listing of inode identifiers corresponding to files in the first file system,
        the first file system is a multi-volume file system,
        the first storage object is an extracted member of multiple volumes of the first file system, and
        the second file system is a multi-volume file system;

selecting a selected directory file in the second file system to be linked to the first file system;

associating a root node of the first file system with the selected directory file; and including a two-dimensional identification of inodes of the single file system in an inode identification scheme, wherein the two-dimensional identification of inodes includes one dimension that is an identifier for an inode list to which an inode belongs and a second dimension which is an inode number itself, wherein an inode identifier comprises the inode number and the inode list identifier, wherein the inode list identifier identifies the first file system, and the inode list identifier uniquely identifies a file in the first file system over any file in the second file system.

2. The method of claim 1, wherein the inode list identifier uniquely identifies an inode list associated with the inode.

3. The method of claim 1 further comprising:

selecting a selected directory file in the second file system to be linked to the first file system; and associating a root node of the first file system with the selected directory file.

4. The method of claim 3 further comprising:

forming a merged file system from the first file system and the second file system.

5. A computer-readable storage medium comprising:

a first set of instructions, executable on a computer system, configured to include a first storage object in a set of storage objects, wherein each storage object of the plurality of storage objects is a device used to store data, the first storage object comprises a first file system stored in the first storage object, and the set of storage objects comprises a second storage object, and a second file system stored in the set of storage objects; and a second set of instructions, executable on the computer system, configured to:

integrate metadata from the first file system with metadata from the second file system, such that the first and second file systems are merged into a single file system, wherein the metadata from the first file system comprises a listing of inode identifiers corresponding to files in the first file system, the first file system is a multi-volume file system, the first storage object is an extracted member of multiple volumes of the first file system, and the second file system is a multi-volume file system;

select a selected directory file in the second file system to be linked to the first file system;

associate a root node of the first file system with the selected directory file; and include a two-dimensional identification of inodes of the single file system in an inode identification scheme, wherein the two-dimensional identification of inodes includes one dimension that is an identifier for an inode list to which an inode belongs and a second dimension which is an inode number itself, wherein an inode identifier comprises the inode number and the inode list identifier, wherein the inode list identifier identifies the first file system, and the inode list identifier uniquely identifies a file in the first file system over any file in the second file system.

6. The computer-readable storage medium of claim 5 further comprising:

a third set of instructions, executable on the computer system, configured to select a selected directory file in the second file system to be linked to the first file system; and a fourth set of instructions, executable on the computer system, configured to associate a root node of the first file system with the selected directory file.

7. The computer-readable storage medium of claim 6 further comprising:

a fifth set of instructions, executable on the computer system, configured to form a merged file system from the first file system and the second file system.

* * * * *